(12) United States Patent
Apeldorn et al.

(10) Patent No.: US 12,441,858 B2
(45) Date of Patent: Oct. 14, 2025

(54) ARTICLE WITH THERMAL INSULATION PROPERTIES

(71) Applicant: 3M INNOVATIVE PROPERTIES COMPANY, St. Paul, MN (US)

(72) Inventors: Thomas Apeldorn, Mönchengladbach (DE); Michael Kempf, Neuss (DE); Pierre Bieber, Korschenbroich (DE); René Kuhlmann, Düsseldorf (DE); Simon Plugge, Düsseldorf (DE); Björn Hoffmann, Mettmann (DE); David Rudek, Düsseldorf (DE); Roman Konietzny, Schwalmtal (DE)

(73) Assignee: 3M Innovative Properties Company, St. Paul, MN (US)

( * ) Notice: Subject to any disclaimer, the term of this patent is extended or adjusted under 35 U.S.C. 154(b) by 117 days.

(21) Appl. No.: 18/007,234

(22) PCT Filed: Jul. 22, 2021

(86) PCT No.: PCT/IB2021/056654
§ 371 (c)(1),
(2) Date: Jan. 27, 2023

(87) PCT Pub. No.: WO2022/023903
PCT Pub. Date: Feb. 3, 2022

(65) Prior Publication Data
US 2023/0303794 A1    Sep. 28, 2023

(30) Foreign Application Priority Data

Jul. 31, 2020 (EP) .................................. 20189020

(51) Int. Cl.
*C08J 9/00* (2006.01)
*B32B 5/20* (2006.01)
(Continued)

(52) U.S. Cl.
CPC .............. *C08J 9/0066* (2013.01); *B32B 5/20* (2013.01); *B32B 27/065* (2013.01); *B32B 27/36* (2013.01);
(Continued)

(58) Field of Classification Search
None
See application file for complete search history.

(56) References Cited

U.S. PATENT DOCUMENTS

| 4,593,049 A | 6/1986 | Bauman et al. |
| 6,022,904 A | 2/2000 | Sollradl et al. |

(Continued)

FOREIGN PATENT DOCUMENTS

| CN | 206584983 U | 10/2017 |
| CN | 207883748 U | 9/2018 |

(Continued)

OTHER PUBLICATIONS

"Electric Vehicle Battery", Wikipedia, [retrieved on Mar. 27, 2023], URL <https://en.wikipedia.org/wiki/Electric_vehicle_battery>, 2023, pp. 1-28.

(Continued)

*Primary Examiner* — Chinessa T. Golden
(74) *Attorney, Agent, or Firm* — Carlos M. Téllez Rodríguez; 3M Innovative Properties Company (57) ABSTRACT

The present disclosure relates to a cushioning article comprising a non-syntactic polymeric foam layer; and a plurality of spacer elements arranged within the polymeric foam layer, wherein each spacer element is at least partly embedded into the polymeric foam layer, and wherein each spacer element has a size greater than 200 micrometers.

18 Claims, 4 Drawing Sheets

(51) Int. Cl.
*B32B 27/06* (2006.01)
*B32B 27/36* (2006.01)
*C08J 9/42* (2006.01)
*C08K 3/22* (2006.01)
*C08K 7/14* (2006.01)
*C08K 7/20* (2006.01)
*F16L 59/02* (2006.01)
*F16L 59/07* (2006.01)

(52) U.S. Cl.
CPC .................... *C08J 9/42* (2013.01);
*C08K 3/22* (2013.01); *C08K 7/14* (2013.01);
*C08K 7/20* (2013.01); *F16L 59/029* (2013.01);
*F16L 59/07* (2013.01); *B32B 2250/03*
(2013.01); *B32B 2250/40* (2013.01); *B32B
2264/101* (2013.01); *B32B 2266/0214*
(2013.01); *B32B 2307/302* (2013.01); *B32B
2307/304* (2013.01); *B32B 2307/3065*
(2013.01); *B32B 2307/308* (2013.01); *B32B
2307/54* (2013.01); *B32B 2457/10* (2013.01);
*C08J 2383/04* (2013.01); *C08J 2483/04*
(2013.01); *C08K 2003/2227* (2013.01)

(56) References Cited

U.S. PATENT DOCUMENTS

| | | |
|---|---|---|
| 2007/0259258 A1 | 11/2007 | Buck |
| 2011/0006267 A1* | 1/2011 | Simpson ............... B29C 70/882 |
| | | 252/514 |
| 2011/0155946 A1 | 6/2011 | Simpson |
| 2016/0308186 A1 | 10/2016 | Han |
| 2018/0223069 A1 | 8/2018 | O'Neil et al. |
| 2019/0165408 A1 | 5/2019 | Andryukov et al. |
| 2019/0393574 A1 | 12/2019 | Goeb et al. |
| 2020/0198305 A1 | 6/2020 | Gardner et al. |

FOREIGN PATENT DOCUMENTS

| | | |
|---|---|---|
| CN | 208548433 U | 2/2019 |
| DE | 102012223566 A1 | 6/2014 |
| DE | 102018113815 B4 | 2/2020 |
| EP | 0940446 B1 | 3/2001 |
| EP | 2403050 B1 | 7/2018 |
| EP | 3352290 A1 | 7/2018 |
| EP | 3553877 A1 | 10/2019 |
| EP | 3580790 A1 | 12/2019 |
| JP | 2020080214 A | 5/2020 |
| WO | 2004081311 A2 | 9/2004 |
| WO | 2011016962 A2 | 2/2011 |
| WO | 2011057737 A1 | 5/2011 |
| WO | 2014059348 A2 | 4/2014 |
| WO | 2015086669 A2 | 6/2015 |
| WO | 2016139038 A1 | 9/2016 |
| WO | 2017060038 A1 | 4/2017 |
| WO | 2018148282 A1 | 8/2018 |
| WO | 2019217201 A1 | 11/2019 |
| WO | 2021176372 A1 | 9/2021 |

OTHER PUBLICATIONS

"Electric Vehicle", Wikipedia, [retrieved on Mar. 27, 2023], URL <https://en.wikipedia.org/wiki/Electric_vehicle>, 2023, pp. 1-35.
International Search Report for PCT International Application No. PCT/IB2021/056654, mailed on Oct. 11, 2021, 6 pages.

* cited by examiner

ARTICLE WITH THERMAL INSULATION PROPERTIES

CROSS REFERENCE TO RELATED APPLICATIONS

Carlos M. Téllez Rodriguez

This application is a national stage filing under 35 U.S.C. 371 of PCT/IB2021/056654, filed Jul. 22, 2021, which claims the benefit of European Application No. 20189020.9, filed Jul. 31, 2020, the disclosure of which is incorporated by reference in its/their entirety herein.

TECHNICAL FIELD

The present disclosure relates generally to the field of cushioning articles, more specifically to the field of cushioning articles having thermal insulation properties. The present disclosure also relates to a method of manufacturing such cushioning articles and to their use for industrial applications, in particular for thermal management applications in the transportation industry.

BACKGROUND

Automotive electrification is currently one of the biggest trends in the automotive industry. Within this trend, the propulsion of electric energy supplied by electric batteries and the development of suitable electric vehicle batteries as energy storage devices are the main focus in the automotive industry. Electric-vehicle batteries are used to power the propulsion system of battery electric vehicles (BEVs) and hybrid electric vehicles (HEVs). These batteries, which are typically lithium ion batteries, are designed with a high ampere hour capacity. The trend in the development of electric vehicle batteries goes to higher energy density in the battery (kWh/kg) to allow the covering of longer distances and to reducing charging times of the battery.

Due to the high energy density of electric vehicle batteries and the high energy flow during charging or discharging of the battery, there is a risk of creation of hot spots and thermal runaway events where the heat generated by the decomposition of battery cells propagates very rapidly to neighboring cells. This chain reaction might lead to the explosion or the fire catching of the whole electric vehicle.

Moreover, during the normal life cycle of these energy storage devices, in particular during fast charging and discharging cycles of electric vehicle batteries, the battery cells used for such battery modules tend to expand and retract continuously. These expansion/contraction cycles can put the battery cells under considerable pressure conditions, which in turn may lead to not only mechanical damages of the battery cells.

In that context, the use of thermal management solutions has rapidly emerged as one way the mitigate the temperature rise in battery assemblies. One partial solution is disclosed in US-A1-2007/0259258 (Buck) which describes the use of heat absorbing material to absorb the heat generated by the battery cells of a battery pack assembly and transfer heat out from the case of the assembly thereby maintaining a lower temperature inside each battery pack and the overall battery assembly. Another partial solution is described in US-A1-2019393574 (Goeb et al.) which discloses the use of thermally conductive gap filler compositions comprising thermally conductive filler material for cooling battery assemblies. Still another partial solution is described in US-A1-2016/0308186 (Han), which discloses a battery module including battery cells arranged adjacent to each other along a first direction, a spacer between neighboring battery cells, and a multi-layer insulation sheet between the neighboring battery cells together with the spacer, wherein the multi-layer insulation sheet includes a plurality of insulation layers extending in parallel with the surfaces of the battery cells.

SUMMARY

According to one aspect, the present disclosure relates to a cushioning article comprising a non-syntactic polymeric foam layer; and a plurality of spacer elements arranged within the polymeric foam layer, wherein each spacer element is at least partly embedded into the polymeric foam layer, and wherein each spacer element has a size (of its greatest dimension) greater than 200 micrometers.

According to another aspect, the present disclosure is directed to a process for manufacturing a cushioning article as described above, wherein the process comprises the steps of providing a polymeric foam layer as described above; providing a plurality of spacer elements as described above; and incorporating the plurality of spacer elements into the polymeric foam layer such that the plurality of spacer elements is arranged within the polymeric foam layer such that each spacer element is at least partly embedded into the polymeric foam layer.

According to yet another aspect, the present disclosure relates to the use of a cushioning article as described above, for industrial applications, in particular for thermal management applications in the transportation industry.

DETAILED DESCRIPTION

According to a first aspect, the present disclosure relates to a cushioning article comprising a non-syntactic polymeric foam layer; and a plurality of spacer elements arranged within the polymeric foam layer, wherein each spacer element is at least partly embedded into the polymeric foam layer, and wherein each spacer element has a size (of its greatest dimension) greater than 200 micrometers.

In the context of the present disclosure, it has been surprisingly found that a cushioning article as described above is provided with excellent thermal insulation properties, excellent thermal runaway barrier performance, and excellent compressibility characteristics. In some advantageous aspects, the multilayer construction as described above is further provided with excellent heat resistance and stability even at temperatures up to 600° C. and prolonged exposure to heat.

The described multilayer construction is further characterized by one or more of the following advantageous benefits: a) excellent cushioning performance towards individual battery cells when used in battery assemblies; b) excellent resistance to high compression forces and high-pressure conditions; c) ability to maintain a foam structure for the polymeric foam layer even under high-pressure conditions; d) easy and cost-effective manufacturing method, based on readily available starting materials and minimized manufacturing steps; e) construction simplicity and versatility; f) excellent formulation flexibility of the polymeric foam layer for use herein; g) excellent construction and design flexibility of the spacer layer into various forms, sizes and shapes; h) ability to fine-tune the compression characteristics of the multilayer construction to specific applications, operating conditions and battery cell types; i) excellent pressure distribution towards individual battery cells when used in battery assemblies; j) excellent processability and converting characteristics; k) low thermal conductivity; l) ability to be produced in relatively low thicknesses; m) ready-to-use article in particular for thermal management applications; n) prolonged durability of the energy storage assemblies using the cushioning article of the disclosure; and o) ability to adhere to various substrates such as metallic or polymeric surfaces without requiring adhesion-promoting processing steps or compositions.

Those are particularly unexpected findings in many aspects. Firstly, because good cushioning performance and resistance to high compression forces and high-pressure conditions are believed to be self-contradicting properties. Also, thermal insulation and heat resistance stability are usually not expected to be obtained with compressible (soft) polymeric foam layers, in particular foam layers having a relatively low thickness, and more in particular with compression applied.

In the context of the present disclosure, the Applicant was faced with the technical challenge of designing a cushioning construction provided with a delicate balance of excellent compressibility characteristics, resistance to high compression forces and thermal insulation properties.

Without wishing to be bound by theory, it is believed that these excellent characteristics and performance attributes are due in particular to the combination of the following technical features: a) the use of a polymeric foam layer; and b) the use of a plurality of spacer elements arranged within the polymeric foam layer, wherein each spacer element is at least partly embedded into the polymeric foam layer, and wherein each spacer element has a size (of its greatest dimension) greater than 200 micrometers.

Still without wishing to be bound by theory, it is believed that the plurality of spacer elements as described above advantageously acts as a counterforce means for preventing or at least reducing unwanted compression forces endured by the polymeric foam not only during the normal charging and discharging cycles of electric vehicle batteries, but also during more extreme conditions such as thermal runaway events. More specifically, it is believed that the plurality of spacer elements as described above has the ability to maintain a critical and minimum gap between the battery cells even under high-pressure conditions, whilst still ensuring the proper cushioning properties necessary for allowing the battery cells to expand and contract during their life cycle. This ability to maintain this set of properties is believed to directly and advantageously impact the excellent thermal insulation properties provided by the cushioning article of the disclosure.

The above-detailed set of advantageous properties provided by the multilayer construction described herein is even more surprising considering that the above-described plurality of spacer elements would have been expected to detrimentally affect the foam structure of the polymeric foam layer thereby compromising the thermal barrier properties. The advantageous thermal insulation properties provided by the cushioning article of the present disclosure are further counter-intuitive considering that the skilled person would have actually expected a poorer performance due to the replacement of the air bubbles comprised in the polymeric foam layer by solid spacer elements having in particular a relatively high particle size.

As such, the cushioning article is suitable for use in various industrial applications, in particular for thermal management applications. The cushioning article of the present disclosure is particularly suitable for thermal management applications in the transportation industry (in particular automotive industry), in particular as a thermal barrier, more in particular as a thermal runaway barrier. The cushioning article as described herein is outstandingly suitable for use as a spacer having thermal runaway barrier properties in rechargeable electrical energy storage systems, in particular battery modules. Advantageously still, the cushioning article of the disclosure may be used in the manufacturing of battery modules, in particular electric-vehicle battery modules and assemblies. In a beneficial aspect, the cushioning article as described herein is suitable for manual or automated handling and application, in particular by fast robotic equipment, due in particular to its excellent robustness, dimensional stability and handling properties. In some advantageous aspects, the described cushioning article is also able to meet challenging fire regulation norms due its outstanding flammability and heat stability characteristics.

In the context of the present disclosure, the term "adjacent" is meant to designate two superimposed films or layers which are arranged either directly next to each other, i.e. which are abutting each other, or which are arranged not directly next to each other, i.e. when at least one additional film or layer is arranged between the initial two superimposed films or layers. The terms top and bottom layers or films, respectively, are used herein to denote the position of a layer or film relative to the surface of the substrate bearing such layer or film in the process of forming the polymeric foam layer. The direction into which one movable substrate, layer or film is moving is referred to herein as downstream direction. The relative terms upstream and downstream describe the position along the extension of the substrate.

In the context of the present disclosure still, the term "neat polymeric foam layer" is meant to designate the polymeric foam layer deprived of the spacer elements.

Polymeric foam layers for use herein are not particularly limited. Suitable polymeric foam layers for use herein may be easily identified by those skilled in the art in the light of the present disclosure.

According to an advantageous aspect, the polymeric foam layer for use herein comprises a material having a weight loss after 3 min at 600° C. of no greater than 70%, no greater than 60%, no greater than 50%, no greater than 40%, no greater than 30%, or even no greater than 25%, when measured according to the thermal stability test method described in the experimental section.

The types of polymeric foam layers as described above are typically referred to as thermally resistant materials or thermally resistant polymeric foam layers.

According to an exemplary aspect, the polymeric foam layer for use in the multilayer construction of the disclosure comprises a material selected from the group consisting of elastomeric materials, thermoplastic materials, thermoplastic elastomer materials, thermoplastic non-elastomeric materials, thermoset materials, and any combinations or mixtures thereof.

In one advantageous aspect, the polymeric foam layer for use herein comprises a material selected from the group consisting of silicone elastomers, fluorosilicone rubber, aromatic polyamides, polybenzimidazoles, polysulfides, polyimides, polysulfones, polyetherketones, fluorocarbons, polyisoprene, polybutadiene, polychloroprene, polyurethanes, polyolefins (in particular PE, PP and EVA), polystyrenes, and any combinations or mixtures thereof.

In a more advantageous aspect, the polymeric foam layer for use herein comprises a material selected from the group consisting of elastomeric materials.

In another more advantageous aspect, the polymeric foam layer for use herein reaches a compression value of at least 60% when using a compression force of no greater than 700 kPa, no greater than 600 kPa, no greater than 500 kPa, no greater than 400 kPa, no greater than 300 kPa, no greater than 250 kPa, no greater than 200 kPa, no greater than 150 kPa, no greater than 100 kPa, no greater than 80 kPa, no greater than 60 kPa, or even no greater than 50 kPa, when measured according to the compression test method described in the experimental section. This type of polymeric foam layers is typically referred to as (relatively highly) compressible polymeric foam layers (or soft polymeric foam layers).

In another more advantageous aspect, the polymeric foam layer for use herein comprises a material selected from the group consisting of silicone elastomers, in particular silicone rubbers, more in particular organopolysiloxane polymers.

In one particularly advantageous aspect of the disclosure, the polymeric foam layer for use herein is a silicone rubber foam layer.

According to an advantageous aspect, the silicone rubber foam layer for use herein is obtainable from a curable and foamable precursor of the silicone rubber foam layer, in particular an in-situ foamable precursor composition.

Precursor compositions of the silicone rubber foam for use herein are not particularly limited, as long as they are curable and foamable. Any curable and foamable precursors of a silicone rubber foam commonly known in the art may be formally used in the context of the present disclosure. Suitable curable and foamable precursors of a silicone rubber foam for use herein may be easily identified by those skilled in the art in the light of the present disclosure.

According to a more advantageous aspect, the precursor of the silicone rubber foam layer for use herein is a two-part composition.

In a typical aspect, the two-part precursor composition of the silicone rubber foam is selected from the group consisting of addition curing type two-part silicone compositions, condensation curing type two-part silicone compositions, and any combinations or mixtures thereof.

In a preferred aspect, the precursor of the silicone rubber foam for use herein comprises an addition curing type two-part silicone composition, in particular an addition curing type two-part organopolysiloxane composition.

Suitable addition curing type two-part organopolysiloxane compositions for use herein as the precursor of the silicone rubber foam may be easily identified by those skilled in the art. Exemplary addition curing type two-part organopolysiloxane compositions for use herein are described e.g. in U.S. Pat. No. 4,593,049 (Bauman et al.).

According to a particularly advantageous aspect of the present disclosure, the precursor of the silicone rubber foam for use herein comprises at least one organopolysiloxane compound A; at least one organohydrogenpolysiloxane compound B comprising at least two, in particular at least three hydrogen atoms per molecule; at least one hydroxyl containing compound C; an effective amount of a curing catalyst D, in particular a platinum-based curing catalyst; and optionally, a foaming agent.

In an exemplary aspect, the at least one organopolysiloxane compound A for use herein has the following formula:

wherein:
R and R", are independently selected from the group consisting of $C_1$ to $C_{20}$ hydrocarbon groups, and in particular R is an alkyl group chosen from the group consisting of methyl, ethyl, propyl, trifluoropropyl, and phenyl, and optionally R is a methyl group;

R' is a $C_1$ to $C_{20}$ alkenyl group, and in particular R' is chosen from the group consisting of vinyl, allyl, hexenyl, decenyl and tetradecenyl, and more in particular R' is a vinyl group;

R" is in particular an alkyl group such as a methyl, ethyl, propyl, trifluoropropyl, phenyl, and in particular R" is a methyl group; and n is an integer having a value in a range from 5 to 1000, and in particular from 5 to 100.

In another exemplary aspect, the at least one hydroxyl containing compound C for use herein is selected from the group consisting of alcohols, polyols in particular polyols having 3 to 12 carbon atoms and having an average of at least two hydroxyl groups per molecule, silanols, silanol containing organopolysiloxanes, silanol containing silanes, water, and any combinations or mixtures thereof.

In still another exemplary aspect, the at least one hydroxyl containing compound C for use herein is selected from the group consisting of silanol containing organopolysiloxanes.

According to an advantageous aspect of the present disclosure, the polymeric foam layer for use herein is obtainable by a process comprising the steps of:
a) providing a substrate;
b) providing a first solid film and applying it onto the substrate;
c) providing a coating tool provided with an upstream side and a downstream side, wherein the coating tool is offset from the substrate to form a gap normal to the surface of the substrate;
d) moving the first solid film relative to the coating tool in a downstream direction;
e) providing a curable (and foamable) precursor of the polymeric foam to the upstream side of the coating tool thereby coating the precursor of the polymeric foam through the gap as a layer onto the substrate provided with the first solid film;

f) providing a second solid film and applying it (at least partly) along the upstream side of the coating tool, such that the first solid film and the second solid film are applied simultaneously with the formation of the (adjacent) layer of the precursor of the silicone rubber foam;

g) foaming or allowing the precursor of the polymeric foam to foam;

h) curing or allowing the layer of the precursor of the polymeric foam to cure thereby forming the polymeric foam layer;

i) optionally, exposing the layer of the precursor of the polymeric foam to a thermal treatment; and optionally, removing the first solid film and/or the second solid film from the polymeric foam layer.

Figure 1:
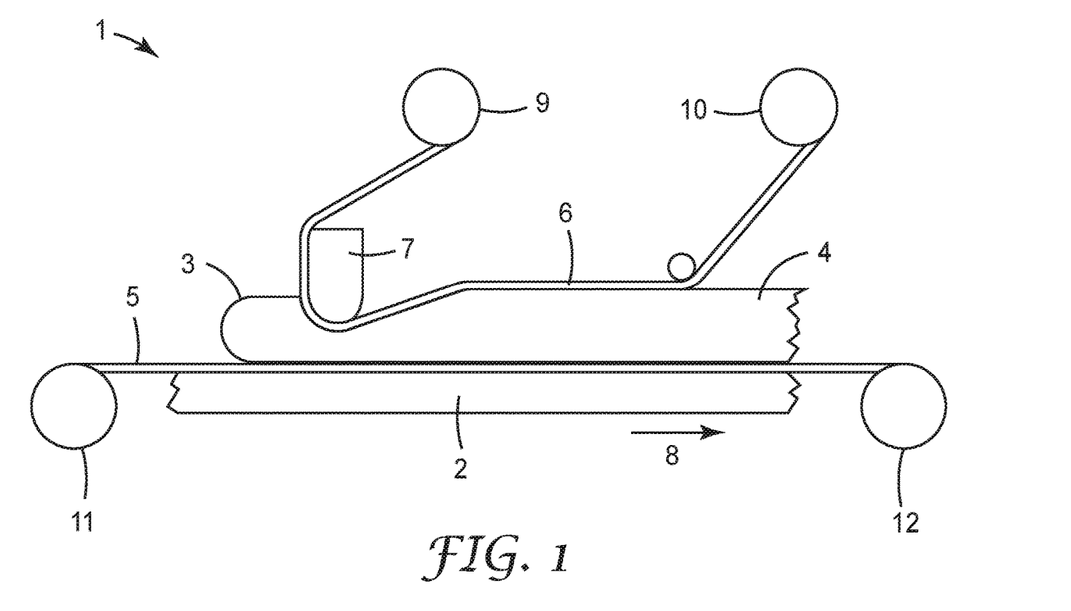
FIG. 1 is a schematic representation of one exemplary coating apparatus and a process of manufacturing one exemplary polymeric foam layer for use in the present disclosure.

A schematic representation of an exemplary process of manufacturing a polymeric foam layer (in particular a silicone rubber foam layer) and a coating apparatus suitable for use in the manufacturing process is shown in FIG. 1. The coating apparatus 1 comprises a substrate 2, a coating tool 7 in the form of a coating knife, an unwinding roll 11 and a winding roll 12 for the first solid film 5, an unwinding roll 9 and a winding roll 10 for the second solid film 6. The downstream direction 8 in which (the substrate 2 provided with) the first solid film 5 is moved relative to the coating tool 7 is represented with an arrow accompanied with the corresponding reference numeral.

In a typical aspect of the disclosure, the curable and foamable precursor of the polymeric foam 3 is provided to the upstream side of the coating tool 7 thereby coating the precursor of the polymeric foam 3 through the gap as a layer onto the substrate 2 provided with the first solid film 5. In FIG. 1, the curable and foamable precursor of the polymeric foam 3 is represented as forming a so-called "rolling bead" at the upstream side of the coating tool 7. The second solid film 6 is applied (at least partly) along the upstream side of the coating tool 7, such that the first solid film 5 and the second solid film 6 are applied simultaneously with the formation of the layer of the precursor of the polymeric foam 3. The layer of the precursor of the polymeric foam 3 is thereafter allowed to foam and cure resulting into the polymeric foam layer 4, which is typically provided with the first solid film 5 on its bottom surface and with the second solid film 6 on its top surface. Optionally, the layer of the precursor of the polymeric foam 3 may be exposed to a thermal treatment, typically in an oven (not shown). In a typical aspect, the foaming of the layer of the precursor of the polymeric foam 3 results in a polymeric foam layer 4 having a thickness higher than the initial layer of the precursor of the polymeric foam 3. After processing, the first solid film and/or the second solid film 6 may be removed from the polymeric foam layer 4.

According to an advantageous aspect, the precursor of the polymeric foam for use herein is an in-situ foamable composition, meaning that the foaming of the precursor occurs without requiring any additional compound, in particular external compound.

According to another advantageous aspect, the foaming of the precursor of the polymeric foam for use herein is performed with a gaseous compound, in particular hydrogen gas.

In a more advantageous aspect, the foaming of the precursor of the polymeric foam for use herein is performed by any of gas generation or gas injection.

According to a preferred aspect, the foaming of the precursor of the polymeric foam for use herein is performed by gas generation, in particular in-situ gas generation.

In an alternative and less advantageous aspect, the precursor of the polymeric foam for use herein further comprises an optional blowing agent.

Substrates for use herein are not particularly limited. Suitable substrates for use herein may be easily identified by those skilled in the art in the light of the present disclosure.

In a typical aspect of the disclosure, the substrate for use herein is a temporary support used for manufacturing purpose and from which the silicone rubber foam layer is separated and removed subsequent to foaming and curing. The substrate may optionally be provided with a surface treatment adapted to allow for a clean removal of the silicone rubber foam layer from the substrate (through the first solid film). Advantageously, the substrate for use herein and providing a temporary support may be provided in the form of an endless belt. Alternatively, the substrate for use herein may be a stationary (static) temporary support.

In one particular aspect of the disclosure, the polymeric foam layer obtained after foaming and curing is separated from the substrate and can be wound up, for example, into a roll.

According to one advantageous aspect of the disclosure, the substrate for use herein comprises a material selected from the group consisting of polymers, metals, ceramics, composites, and any combinations or mixtures thereof.

The polymeric foam layer for use in the disclosure may be obtainable by a process using a coating tool provided with an upstream side and a downstream side. The coating tool is offset from the substrate to form a gap normal to the surface of the substrate.

Coating tools for use herein are not particularly limited. Any coating tools commonly known in the art may be used in the context of the present disclosure. Suitable coating tools for use herein may be easily identified by those skilled in the art in the light of the present disclosure.

The coating tools useful in the present disclosure each have an upstream side (or surface) and a downstream side (or surface). In a typical aspect, the coating tool for use herein is further provided with a bottom portion facing the surface of the substrate receiving the precursor of the polymeric foam. The gap is measured as the minimum distance between the bottom portion of the coating tool and the exposed surface of the substrate. The gap can be essentially uniform in the transverse direction (i.e. in the direction normal to the downstream direction) or it may vary continuously or discontinuously in the transverse direction, respectively. The gap between the coating tool and the surface of the substrate is typically adjusted to regulate the thickness of the respective coating in conjunction with other parameters including, for example, the speed of the substrate in the downstream direction, the type of the coating tool, the angle with which the coating tool is oriented relative to the normal of the substrate, and the kind of the substrate.

In one advantageous aspect of the disclosure, the gap formed by the coating tool from the substrate (coating tool gap) is in a range from 10 to 3000 micrometers, from 50 to 2500 micrometers, from 50 to 2000 micrometers, from 50 to 1500 micrometers, from 100 to 1500 micrometers, from 100 to 1000 micrometers, from 200 to 1000 micrometers, from 200 to 800 micrometers, or even from 200 to 600 micrometers.

The coating tool for use herein can be arranged normal to the surface of the substrate, or it can be tilted whereby the angle between the substrate surface and the downstream side (or surface) of the coating tool is in arrange from 50° to 130°, or even from 80° to 100°. The coating tool useful in the present disclosure is typically solid and can be rigid or flexible. The coating tool for use herein may take various shapes, forms and sizes depending on the targeted application and expected characteristics of the silicone rubber foam layer.

In an advantageous aspect, the coating tool for use herein comprises a material selected from the group consisting of polymers, metals, ceramics, composites, glass, and any combinations or mixtures thereof. More advantageously, the coating tool for use herein comprises a material selected from the group consisting of metals, in particular aluminum, stainless steel, and any combinations thereof. Flexible coating tools for use herein are typically relatively thin and having in particular a thickness in the downstream direction in a range from 0.1 to 0.75 mm. Rigid coating tools for use herein are usually at least 1 mm, or even at least 3 mm thick.

According to a typical aspect of the disclosure, the coating tool for use herein is selected from the group consisting of coating knifes, coating blades, coating rolls, coating roll blades, and any combinations thereof.

In an advantageous aspect, the coating tool for use herein is selected from the group of coating knifes. It has been indeed found that the use of a coating tool in the form of a coating knife provides a more reproducible coating process and better-quality coating, which translates into a silicone rubber foam layer provided with advantageous properties.

In another advantageous aspect, the coating tool for use herein is selected from the group of coating rolls and air knives.

According to another advantageous aspect, the cross-sectional profile of the bottom portion of the coating tool (in particular, a coating knife) in the longitudinal direction is designed so that the precursor layer is formed, and the excess precursor is removed. Typically, the cross-sectional profile of the bottom portion which the coating tool exhibits at its transversely extending edge facing the substrate, is essentially planar, curved, concave or convex.

Suitable coating tools for use herein are described in co-pending EP patent application No. 20160564.9, in the name of 3M Innovative Properties Company).

According to an advantageous aspect of the present disclosure, the polymeric foam layer of the disclosure is obtainable by a process wherein the step of providing a curable (and foamable) precursor of the polymeric foam to the upstream side of the coating tool is performed immediately prior to the step of providing a second solid film and applying it along the upstream side of the coating tool, such that the first solid film and the second solid film are applied simultaneously with the formation of the (adjacent) layer of the precursor of the polymeric foam.

According to another advantageous aspect of the present disclosure, the step of foaming or allowing the precursor of the polymeric foam to foam and the step of curing or allowing the layer of the precursor of the polymeric foam to cure thereby forming the polymeric foam layer are performed simultaneously.

The solid films for use herein as the first and the second solid films are not particularly limited. Any solid films commonly known in the art may be formally used in the context of the present disclosure. Suitable solid films for use herein may be easily identified by those skilled in the art in the light of the present disclosure.

According to one advantageous aspect, the first solid film and/or the second solid film for use in the present disclosure are impermeable films, in particular impermeable flexible films. As used herein, the term "impermeable" is meant to refer to impermeability to liquids and gaseous compounds, in particular to gaseous compounds.

According to another advantageous aspect of the disclosure, the first solid film and/or the second solid film for use herein are selected from the group consisting of polymeric films, metal films, composite films, and any combinations thereof.

In a more advantageous aspect of the disclosure, the first solid film and/or the second solid film for use herein are selected from the group consisting of polymeric films, in particular comprising a polymeric material selected from the group consisting of thermoplastic polymers.

In still a more advantageous aspect of the disclosure, the first solid film and/or the second solid film for use herein are polymeric films, wherein the polymeric material is selected from the group consisting of polyesters, polyethers, polyolefins, polyamides, polybenzimidazoles, polycarbonates, polyether sulfones, polyoxymethylenes, polyetherimides, polystyrenes, polyvinyl chloride, and any mixtures or combinations thereof.

In still a more advantageous aspect of the disclosure, the first solid film and/or the second solid film for use herein are polymeric films comprising a polymeric material selected from the group consisting of polyesters, polyolefins (in particular PP and PE), polyetherimides, and any mixtures or combinations thereof.

In a particularly advantageous aspect, the first solid film and/or the second solid film for use in the present disclosure are polymeric films comprising a polymeric material selected from the group consisting of polyesters, in particular polyethylene terephthalate.

According to an advantageous aspect of the present disclosure, the polymeric foam layer of the disclosure is obtainable by a process wherein the first solid film is applied to the bottom surface of the layer of the precursor of the polymeric foam, and the second solid film is applied to the top (exposed) surface of the layer of the precursor of the polymeric foam.

In a typical aspect of the disclosure, the first solid film and/or the second solid film are contacted directly to the adjacent polymeric foam layer.

In another advantageous aspect of the present disclosure, the first major (top) surface and the second (opposite) major (bottom) surface of the polymeric foam layer and/or the first solid film and/or the second solid film are free of any adhesion-promoting compositions or treatments, in particular free of priming compositions, adhesive compositions and physical surface treatments.

In an alternatively advantageous aspect of the present disclosure, the first major (top) surface and the second (opposite) major (bottom) surface of the polymeric foam layer and/or the first solid film and/or the second solid film comprises an adhesion-promoting compositions or treatments, in particular priming compositions, adhesive compositions and physical surface treatments.

In still another advantageous aspect of the disclosure, no intermediate layers of any sorts are comprised in-between the first major (top) surface or the second (opposite) major (bottom) surface of the polymeric foam layer and the first solid film and/or the second solid film.

In a typical aspect of the disclosure, the first and second solid films are smoothly contacted to the corresponding surfaces of the silicone rubber foam layer in a snug fit thereby avoiding (or at least reducing) the inclusion of air between the solid films and the corresponding surfaces of the polymeric foam layer.

According to one advantageous aspect, the polymeric foam layer for use herein comprises gaseous cavities, in particular gaseous hydrogen cavities, air gaseous cavities, and any mixtures thereof.

According to one advantageous aspect, the polymeric foam layer for use herein comprises gaseous cavities having an oblong shape in the direction of the layer thickness (i.e. in the direction perpendicular to the plane formed by the foam layer).

According to a more advantageous aspect, the gaseous cavities that may be present in the silicone rubber foam layer have an elongated oval shape in the direction of the layer thickness.

Advantageously still, the gaseous cavities for use herein are not surrounded by any ceramic or polymeric shell (other than the surrounding silicone polymer matrix).

In one particular aspect, the gaseous cavities for use herein have a mean average size (of its greatest dimension) no greater than 500 micrometers, no greater than 400 micrometers, no greater than 300 micrometers, no greater than 200 micrometers, no greater than 150 micrometers, no greater than 120 micrometers, no greater than 100 micrometers, no greater than 80 micrometers, no greater than 60 micrometers, no greater than 50 micrometers, no greater than 40 micrometers, no greater than 30 micrometers, or even greater than 20 micrometers (when calculated from SEM micrographs).

In another particular aspect, the gaseous cavities for use herein have a mean average size (of the greatest dimension) in a range from 5 to 3000 micrometers, from 5 to 2000 micrometers, from 10 to 1500 micrometers, from 20 to 1500 micrometers, from 20 to 1000 micrometers, from 20 to 800 micrometers, from 20 to 600 micrometers, from 20 to 500 micrometers, or even from 20 to 400 micrometers (when calculated from SEM micrographs).

According to a typical aspect, the polymeric foam layer for use herein is free of hollow cavities (surrounded by any ceramic or polymeric shell) selected from the group consisting of hollow microspheres, glass bubbles, expandable microspheres, in particular hydrocarbon filled expandable microspheres, hollow inorganic particles, expanded inorganic particles, and any combinations or mixtures thereof.

According to an advantageous aspect, the polymeric foam layer for use herein comprises a non-syntactic foam.

The polymeric foam layer for use herein may comprise additional (optional) ingredients or additives depending on the targeted application.

In a particular aspect of the disclosure, the polymeric foam layer for use herein further comprises an additive which is in particular selected from the group consisting of flame retardants, softeners, hardeners, filler materials, tackifiers, nucleating agents, colorants, pigments, conservatives, rheology modifiers (in particular aluminum hydroxide, magnesium hydroxide, magnesium carbonate, huntite, hydromagnesite, huntite-hydromagnesite, nesquehonite and calcium carbonate), UV-stabilizers, thixotropic agents, surface additives, flow additives, nanoparticles, antioxidants, reinforcing agents, toughening agents, silica particles, glass or synthetic fibers, thermally insulating particles, electrically conducting particles, electrically insulating particles, infrared opacifier particles, and any combinations or mixtures thereof.

In one beneficial aspect, the polymeric foam layer further comprises a non-flammable (or non-combusting) filler material. In a more beneficial aspect, the non-flammable filler material for use herein is selected from the group of inorganic fibers, in particular from the group consisting of mineral fibers, mineral wool, silicate fibers, ceramic fibers, glass fibers, carbon fibers, graphite fibers, asbestos fibers, aramide fibers, and any combinations or mixtures.

According to a more advantageous aspect, the non-flammable filler material for use herein is selected from the group consisting of mineral fibers, silicate fibers, ceramic fibers, asbestos fibers, aramide fibers, and any combinations or mixtures.

According to a particularly beneficial aspect, the non-flammable filler material for use herein is selected from the group consisting of mineral fibers. In the context of the present disclosure, it has indeed surprisingly been discovered that a polymeric foam (in particular silicone rubber foam) which further comprises mineral fibers are provided with excellent thermal resistance and thermal stability characteristics, as well as improved resistance to surface cracking and surface brittleness even after prolonged exposure to temperatures up to 600° C. Without wishing to be bound by theory, it is believed that these beneficial characteristics are due in particular to the excellent compatibility of the mineral fibers (in particular silicate fibers) with the surrounding polymeric matrix (in particular silicone polymer matrix), which participates in densifying and mechanically stabilizing the resulting matrix.

In a particular aspect of this execution, the non-flammable filler material for use herein is comprised in the polymeric foam in an amount ranging from 0.5 to 40 wt. %, from 1 to 30 wt. %, from 1 to 20 wt. %, from 1 to 10 wt. %, from 1 to 8 wt. %, from 2 to 8 wt. %, from 2 to 6 wt. %, or even from 3 to 6 wt. %, based on the overall weight of the precursor composition of the polymeric foam.

In another typical aspect, the polymeric foam layer for use herein is free of thermally conductive fillers.

According to one advantageous aspect of the disclosure, the neat polymeric foam layer for use herein has a density no greater than 500 kg/m$^3$, no greater than 450 kg/m$^3$, no greater than 400 kg/m$^3$, no greater than 380 kg/m$^3$, no greater than 350 kg/m$^3$, no greater than 320 kg/m$^3$, no greater than 300 kg/m$^3$, no greater than 280 kg/m$^3$, no greater than 250 kg/m$^3$, no greater than 220 kg/m$^3$, or even no greater than 200 kg/m$^3$, when measured according to the method described in the experimental section.

According to another advantageous aspect of the disclosure, the neat polymeric foam layer for use herein has a density in a range from 200 to 500 kg/m$^3$, from 200 to 450 kg/m$^3$, from 200 to 400 kg/m$^3$, from 200 to 380 kg/m$^3$, from 200 to 350 kg/m$^3$, from 200 to 320 kg/m$^3$, from 200 to 300 kg/m$^3$, from 200 to 280 kg/m$^3$, or even from 200 to 250 kg/m$^3$, when measured according to the method described in the experimental section.

According to still another advantageous aspect of the disclosure, the neat polymeric foam layer for use herein has a hardness (Shore 00) greater than 10, greater than 15, greater than 20, greater than 25, greater than 30, greater than 40, or even greater than 50.

According to still another advantageous aspect of the disclosure, the neat polymeric foam layer for use herein has a hardness (Shore 00) in a range from 10 to 80, from 10 to 70, from 20 to 70, from 25 to 60, from 25 to 55, from 30 to 55, from 30 to 50, from 30 to 45, or even from 30 to 40.

According to still another advantageous aspect of the disclosure, the neat polymeric foam layer for use herein has heat transfer time to 150° C. greater than 20 seconds, greater than 40 seconds, greater than 60 seconds, greater than 80 seconds, greater than 100 seconds, greater than 120 seconds, greater than 140 seconds, greater than 150 seconds, greater than 160 seconds, greater than 170 seconds, or even greater than 180 seconds, when measured according to the thermal insulation test method 1 described in the experimental section.

According to still another advantageous aspect of the disclosure, the neat polymeric foam layer for use herein has a heat transfer time to 150° C. in a range from 20 to 200 seconds, from 40 to 200 seconds, from 60 to 200 seconds, from 100 to 200 seconds, from 120 to 200 seconds, from 140 to 200 seconds, from 160 to 200 seconds, or even from 160 to 180 seconds, when measured according to the thermal insulation test method 1 described in the experimental section.

According to yet another advantageous aspect of the disclosure, the neat polymeric foam layer for use herein has a thermal conductivity no greater than 1 W/m·K, no greater than 0.8 W/m·K, no greater than 0.6 W/m·K, no greater than 0.5 W/m·K, no greater than 0.4 W/m·K, no greater than 0.3 W/m·K, no greater than 0.2 W/m·K, no greater than 0.1 W/m·K, no greater than 0.05 W/m·K, or even no greater than 0.01 W/m·K, when measured according to the test method described in the experimental section.

According to yet another advantageous aspect of the disclosure, the neat polymeric foam layer for use herein has a thermal conductivity in a range from 0.01 to 1 W/m·K, from 0.05 to 1 W/m·K, from 0.1 to 1 W/m·K, from 0.2 to 1 W/m·K, or even from 0.2 to 0.8 W/m·K, when measured according to the test method described in the experimental section.

According to yet another advantageous aspect of the disclosure, the neat polymeric foam layer for use herein undergoes a ceramization process at a temperature no greater than 600° C., no greater than 550° C., no greater than 500° C., no greater than 450° C., no greater than 400° C., no greater than 350° C., no greater than 300° C., or even no greater than 250° C.

According to yet another advantageous aspect of the disclosure, the neat polymeric foam layer for use herein undergoes a ceramization process at a temperature in a range from 200° C. to 600° C., from 200° C. to 550° C., from 200° C. to 500° C., from 200° C. to 450° C., from 200° C. to 400° C., from 200° C. to 350° C., from 250° C. to 350° C., or even from 250° C. to 300° C.

In the context of the present disclosure, it has indeed surprisingly been discovered that a polymeric foam layer which has the ability to undergo a ceramization process, in particular at a relatively low temperature, is provided with excellent thermal resistance and thermal stability characteristics.

According to still another advantageous aspect of the disclosure, the neat polymeric foam layer for use herein has a V-0 classification, when measured according to the UL-94 standard flammability test method.

In one advantageous aspect, the neat polymeric foam layer for use herein has a thickness no greater than 10000 micrometers, no greater than 8000 micrometers, no greater than 6000 micrometers, no greater than 5000 micrometers, no greater than 4000 micrometers, no greater than 3000 micrometers, no greater than 2500 micrometers, no greater than 2000 micrometers, or even no greater than 1500 micrometers.

In another advantageous aspect, the neat polymeric foam layer for use herein has a thickness in a range from 100 to 10000 micrometers, from 100 to 8000 micrometers, from 100 to 6000 micrometers, from 200 to 5000 micrometers, from 300 to 5000 micrometers, from 300 to 4500 micrometers, from 300 to 4000 micrometers, from 500 to 4000 micrometers, from 500 to 3000 micrometers, from 500 to 2500 micrometers, from 500 to 2000 micrometers, from 500 to 1500 micrometers, from 800 to 1500 micrometers, or even from 1000 to 1500 micrometers.

According to one particular aspect of the disclosure, the polymeric foam layer for use herein may be provided with the first solid film and/or the second solid film. In an alternative execution, the polymeric foam layer may not be provided with any of the first solid film and/or the second solid film.

As will be apparent to those skilled in the art, the polymeric foam layer for use herein may take various forms, shapes and sizes depending on the targeted application. Similarly, the polymeric foam layer for use herein may be post-processed or converted as it is customary practice in the technical field.

According to one exemplary aspect, the polymeric foam layer for use herein may take the form of a roll which is wound, in particular level-wound, around a core. The polymeric foam layer in the wound roll may or may not be provided with the first solid film and/or the second solid film.

According to one exemplary aspect, the polymeric foam layer for use herein may be cut into smaller pieces of various forms, shapes and sizes.

The cushioning article of the present disclosure further comprises a plurality of spacer elements arranged within the polymeric foam layer, wherein each spacer element is at least partly embedded into the polymeric foam layer, and wherein each spacer element has a size (of its greatest dimension) greater than 200 micrometers.

Spacer elements for use herein are not particularly limited as long as they have a size of its greatest dimension greater than 200 micrometers. Suitable spacer elements for use herein may be easily identified by those skilled in the art in the light of the present disclosure.

According to one advantageous aspect of the disclosure, the two opposite terminal portions of each spacer element are fully embedded into the polymeric foam layer.

According to another advantageous aspect of the disclosure, the spacer elements for use herein are dense (particulate) elements.

According to another advantageous aspect, the spacer elements for use herein are non-hollow (solid) elements.

According to still another advantageous aspect, the spacer elements for use herein are non-porous.

In one beneficial aspect of the cushioning article, the plurality of spacer elements for use herein is arranged within the polymeric foam layer in a uniform (or homogeneous) manner along the plane formed by the polymeric foam layer.

In one particular aspect, the plurality of spacer elements for use herein is arranged in a uniform (or homogeneous) manner and parallel to the plane formed by the polymeric foam layer.

In another beneficial aspect of the cushioning article, the plurality of spacer elements for use herein is arranged within the polymeric foam layer in a uniform (or homogeneous) manner along the thickness of the polymeric foam layer.

In another alternatively advantageous aspect, the plurality of spacer elements is arranged within the polymeric foam layer in a random manner along the plane formed by the polymeric foam layer.

In another alternatively advantageous aspect, the plurality of spacer elements is arranged within the polymeric foam layer in a random manner along the thickness of the polymeric foam layer.

According to a more advantageous aspect, the spacer elements are arranged equally spaced apart from each other within the polymeric foam layer, in particular along the plane formed by the polymeric foam layer.

According to an alternative aspect of the disclosure, the spacer elements for use herein are arranged randomly spaced apart from each other within the polymeric foam layer, in particular along the plane formed by the polymeric foam layer.

According to a typical aspect of the cushioning article of the present disclosure, each spacer element for use herein is provided with an overall external surface, wherein at least part of the overall external surface of each spacer element is embedded into the polymeric foam layer.

According to a beneficial aspect, the plurality of the spacer elements for use herein is arranged within the polymeric foam layer such that from 10 to 100%, from 30 to 100%, from 50 to 100%, from 70 to 100%, from 90 to 100%, from 95 to 100%, or even 100% of the overall external surface of each spacer element is embedded into the polymeric foam layer.

According to a particularly advantageous aspect of the disclosure, the plurality of the spacer elements is fully embedded into the polymeric foam layer.

In one exemplary aspect, each spacer element for use herein has a size (of its greatest dimension) greater than 250 micrometers, greater than 300 micrometers, greater than 350 micrometers, greater than 400 micrometers, greater than 450 micrometers, greater than 500 micrometers, greater than 600 micrometers, greater than 700 micrometers, greater than 800 micrometers, greater than 1000 micrometers, greater than 1500 micrometers, greater than 2000 micrometers, greater than 2500 micrometers, greater than 3000 micrometers, greater than 3500 micrometers, or even greater than 4000 micrometers.

In one advantageous aspect, each spacer element for use herein has a size (of its greatest dimension) in a range from 250 to 6000 micrometers, from 300 to 6000 micrometers, from 400 to 6000 micrometers, from 500 to 6000 micrometers, from 550 to 6000 micrometers, from 600 to 5500 micrometers, from 600 to 5000 micrometers, from 800 to 5000 micrometers, from 800 to 4500 micrometers, or even from 800 to 4000 micrometers.

In a more advantageous aspect of the disclosure, each spacer element for use herein has an aspect ratio AR (ratio x/y), where x is the length of the greatest dimension of the spacer element and y is the length of the smallest dimension of the spacer element, and wherein the aspect ratio of each spacer element is no greater than 5, no greater than 4, no greater than 3, no greater than 2, or even no greater than 1.

According to another advantageous aspect of the present disclosure, the spacer elements for use herein have uniform shapes and/or sizes.

According to another alternatively advantageous aspect of the present disclosure, the spacer elements for use herein have non-uniform shapes and/or sizes.

According to still another alternatively advantageous aspect of the present disclosure, each spacer element for use herein has a regular or irregular shape.

In one exemplary aspect of the disclosure, each spacer element for use herein has an overall shape (when seen from a top view) selected from the group consisting of circular, semi-circular, oval, square, triangular, rectangular, diamond, polygonal, linear stripes, non-linear stripes, curved stripes, and any combinations thereof.

In another exemplary aspect, each spacer element for use herein has an overall shape (when seen from a cross-sectional side view) selected from the group consisting of cylindrical, pyramidal, conical, spherical, semi-spherical, barrel, rod, stick, bar, pole, and any combinations thereof.

Figure 3:
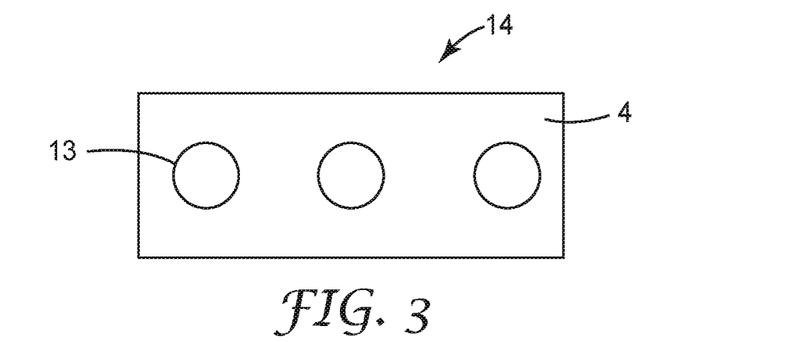
FIG. 3 to FIG. 5 are cross-sectional side views of exemplary cushioning articles according to exemplary aspects of the present disclosure.
Figure 4:
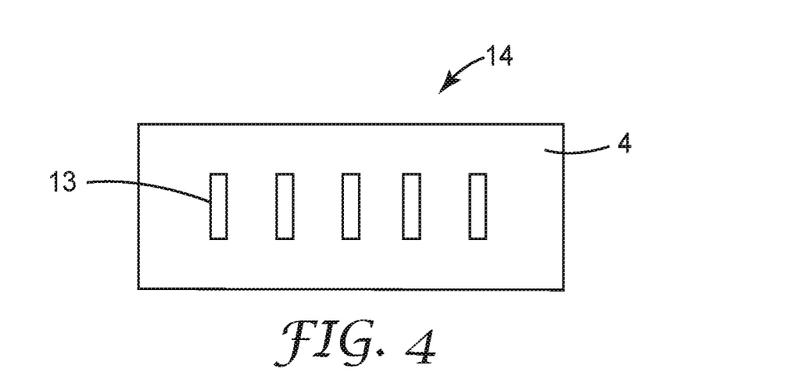
Figure 5:
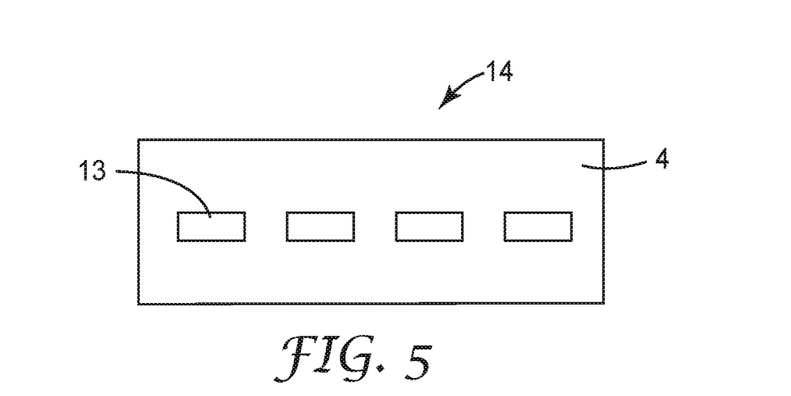

Exemplary spacer elements for use herein are schematically represented in FIG. 3 to FIG. 5, which are cross-sectional side views of exemplary cushioning articles 14 according to exemplary aspects of the present disclosure. In FIG. 3 to FIG. 5, various shapes, sizes and arrangements of spacer elements 13 are represented fully embedded into the polymeric foam layer 4.

In another exemplary aspect of the disclosure, the plurality of spacer elements forms a patterned structure (or a pattern) on the polymeric foam layer (when seen from a top view of the article), and wherein the plurality of (discrete) spacer elements is in particular not interconnected.

In still another exemplary aspect of the disclosure, the plurality of spacer elements forms a patterned structure (or a pattern) on the polymeric foam layer (when seen from a top view of the article), and wherein the plurality of (discrete) spacer elements is in particular interconnected.

In one beneficial aspect, the plurality of spacer elements forms a patterned structure (or a pattern) selected from the group consisting of lattice patterns, quadratic patterns, diamond patterns, honeycomb patterns, patterns comprising straight or wavy lines running in parallel, checkerboard patterns, brick patterns, and any combinations thereof.

Figure 6:
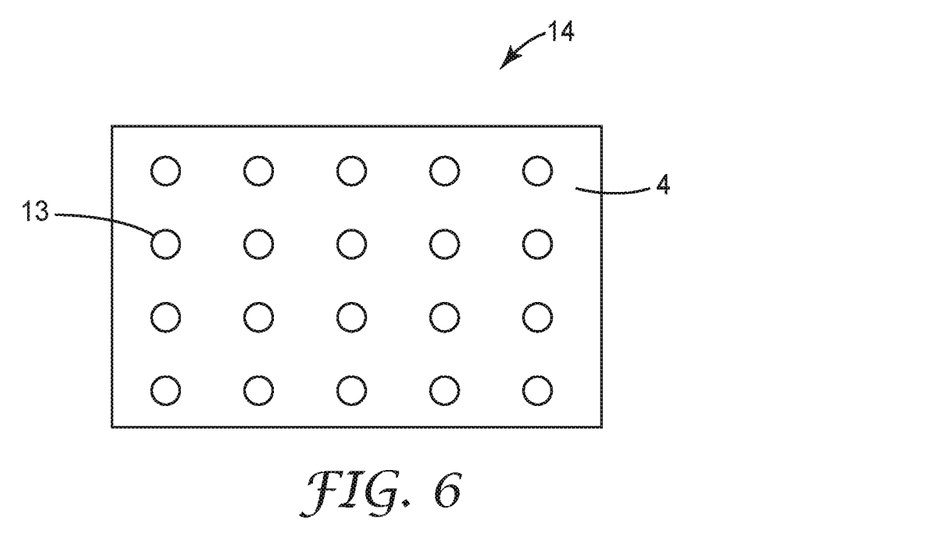
FIG. 6 to FIG. 7 are cross-sectional top views of exemplary cushioning articles according to exemplary aspects of the present disclosure, wherein the spacer elements form a different pattern along the plane formed by the polymeric foam layer.
Figure 7:
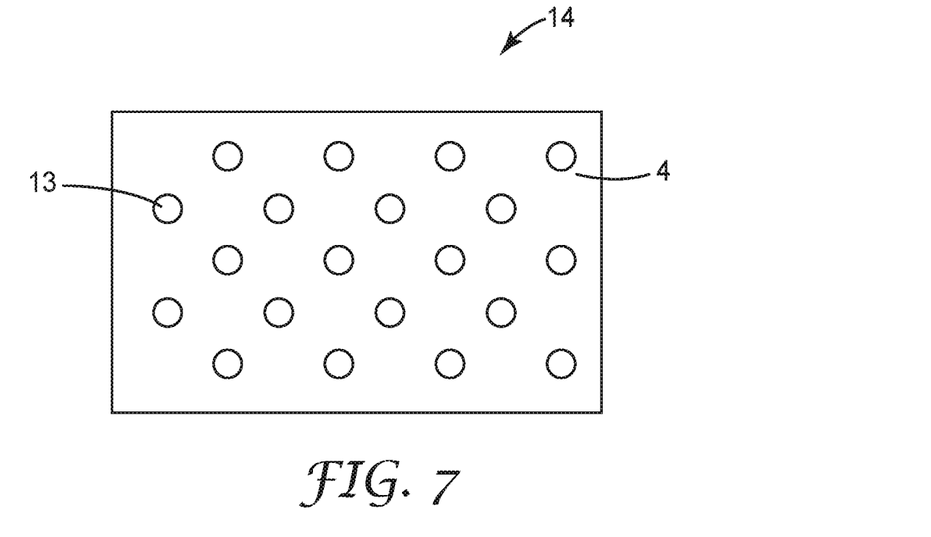

Exemplary patterns formed by the spacer elements for use herein are schematically represented in FIG. 6 and FIG. 7, which are cross-sectional top views of exemplary cushioning articles according to exemplary aspects of the present disclosure, wherein the spacer elements form a different pattern along the plane formed by the polymeric foam layer. In FIG. 6, the plurality of spacer elements forms a quadratic pattern, while in FIG. 7, the plurality of spacer elements forms a diamond pattern.

According to one advantageous of the disclosure, each spacer element for use herein has an overall shape (when seen from a cross-sectional side view of the article) selected from the group consisting of spherical, cylindrical, barrel, rod, stick, bar, pole, pyramidal, conical, and any combinations thereof.

According to a more advantageous of the disclosure, each spacer element for use herein has an overall shape (when seen from a cross-sectional side view of the article) selected from the group consisting of spherical and cylindrical.

According to another advantageous of the disclosure, each spacer element for use herein has an overall shape (when seen from a cross-sectional side view of the article) selected to be spherical, wherein the average diameter of each spherical spacer element is in a range from 250 to 6000 micrometers, from 300 to 6000 micrometers, from 400 to 6000 micrometers, from 500 to 6000 micrometers, from 500 to 5000 micrometers, from 500 to 4000 micrometers, from 550 to 3500 micrometers, from 550 to 3000 micrometers, from 550 to 2500 micrometers, or even from 600 to 2000 micrometers.

According to still another advantageous of the disclosure, each spacer element has an overall shape (when seen from a cross-sectional side view of the article) selected to be cylindrical, wherein the average diameter of each cylindrical spacer element is in a range from 250 to 5000 micrometers, from 300 to 5000 micrometers, from 400 to 5000 micrometers, from 500 to 5000 micrometers, from 500 to 4000 micrometers, from 600 to 3500 micrometers, from 800 to 3000 micrometers, from 800 to 2500 micrometers, or even from 800 to 2000 micrometers.

According to yet another advantageous of the disclosure, each spacer element for use herein has an overall shape (when seen from a cross-sectional side view of the article) selected to be cylindrical, wherein the average height of each cylindrical spacer element is in a range from 250 to 5000 micrometers, from 300 to 4500 micrometers, from 400 to 4500 micrometers, from 500 to 4500 micrometers, from 800 to 4500 micrometers, from 800 to 4000 micrometers, from 1000 to 4000 micrometers, from 1200 to 4000 micrometers, or even from 1500 to 4000 micrometers.

According to yet another advantageous of the disclosure, the ratio of the size (of its greatest dimension) of each spacer element to the thickness of the polymeric foam layer is in a range from 0.1 to 0.9, from 0.1 to 0.8, from 0.2 to 0.7, from 0.2 to 0.6, or even from 0.3 to 0.6.

In the context of the present disclosure, it has been surprisingly discovered that by varying the shapes, sizes and arrangements of the spacer elements within the polymeric foam layer, different compressibility characteristics may be achieved for the corresponding cushioning article, which then translates into different thermal insulation properties and thermal runaway barrier performance. This characteristic provides an excellent construction and design flexibility of the cushioning article which translates into an outstanding ability to fine-tune the compression characteristics of the cushioning article to specific applications, operating conditions and battery cell types. The main factors influencing the compression characteristics of the cushioning article have been found to include: the shapes, sizes and arrangements of the spacer elements within the polymeric foam layer, in particular the distance between the spacer elements, the height of the individual spacer elements, the specific pattern formed by the plurality of the spacer elements within the polymeric foam layer, the degree of embedding and the amount of spacer elements within the polymeric foam layer, and the material used to form the spacer elements.

According to an exemplary aspect, spacer elements comprise (or are made out of) a material selected from the group consisting of elastomeric materials, siliceous materials, ceramic materials, metals, thermoplastic materials, thermoplastic elastomer materials, thermoplastic non-elastomeric materials, thermoset materials, and any combinations or mixtures thereof.

In one advantageous aspect, the spacer elements for use herein comprise (or are made out of) a material selected from the group consisting of silicone elastomers, silicon dioxide (glass), ceramics, fluorosilicone rubber, polyaramides, aromatic polyamides, polybenzimidazoles, polysulfides, polyimides, polysulfones, polyetherketones, flurorocarbons, polyisoprene, polybutadiene, polychloroprene, polyurethanes, polyolefins (PE, PP, EVA), polystyrenes, and any combinations or mixtures thereof.

In a more advantageous aspect, the spacer elements for use herein comprise (or is made out of) a material selected from the group consisting of elastomeric materials.

In another more advantageous aspect, the spacer elements for use herein comprise a material selected from the group consisting of silicone elastomers, in particular silicone rubbers, more in particular organopolysiloxane polymers.

In one particularly advantageous aspect of the disclosure, the spacer elements for use herein comprise a silicone rubber.

In another more advantageous aspect, the spacer elements for use herein comprise (or are made out of) a material selected from the group consisting of siliceous materials, in particular glass.

In another particularly advantageous aspect of the disclosure, the spacer elements for use herein are selected from the group consisting of (solid) glass bubbles, glass beads and glass spheres.

According to one advantageous aspect, the spacer elements for use herein are not (elastically) deformable (or compressible) upon exposure to physical force (or pressure). In the context of the present disclosure, it has been surprisingly discovered that using spacer elements which are not deformable (or compressible) upon exposure to physical force (or pressure) allows improved compressibility control of the cushioning article by introducing a compression limit, which then translates into improved thermal insulation properties and thermal runaway barrier performance.

According to another advantageous aspect, the spacer elements for use herein are at least partly (elastically) deformable (or compressible) upon exposure to physical force (or pressure). In the context of the present disclosure, it has been surprisingly discovered that using spacer elements which are deformable (or compressible) upon exposure to physical force (or pressure) allows improved compressibility customization of the cushioning article by introducing a further compression adjusting element. Using deformable spacer elements further allows a more progressive evolution of the compression force within the polymeric foam layer, which makes this type of spacer elements more suited for articles requiring more cushioning properties. The use of compressible spacer elements additionally allows forming thinner cushioning articles, in particular having thinner polymeric foam layers.

In a particular aspect of the disclosure, the spacer elements for use herein further comprise an additive which is in particular selected from the group consisting of flame retardants, softeners, hardeners, filler materials, tackifiers, nucleating agents, colorants, pigments, conservatives, rheology modifiers (in particular aluminum hydroxide, magnesium hydroxide, magnesium carbonate, huntite, hydromagnesite, huntite-hydromagnesite, nesquehonite and calcium carbonate), UV-stabilizers, thixotropic agents, surface additives, flow additives, nanoparticles, antioxidants, reinforcing agents, toughening agents, silica particles, glass or synthetic fibers, thermally insulating particles, electrically conducting particles, electrically insulating particles, infrared opacifier particles, and any combinations or mixtures thereof.

In one beneficial aspect, the spacer elements for use herein further comprise a non-flammable (or non-combusting) filler material. In a more beneficial aspect, the non-flammable filler material for use herein is selected from the group of inorganic fibers, in particular from the group consisting of mineral fibers, mineral wool, silicate fibers, ceramic fibers, glass fibers, carbon fibers, graphite fibers, asbestos fibers, aramide fibers, and any combinations or mixtures.

According to one particular aspect, the spacer elements further comprise a surface treatment or a surface coating, wherein the surface treatment is in particular selected from the group consisting of hydrophilic and hydrophobic surface treatments, more in particular assisted with silane groups.

According to a typical aspect, the cushioning article of the present disclosure is a cushioning article suitable for cushioning at least one expanding (and/or contracting) surface.

Those expanding and/or contracting surfaces may typically be found in rechargeable electrical energy storage systems, in particular in battery modules, more in particular along the side walls of battery cells.

In one particular aspect of the disclosure, the at least one expanding and/or contracting surface expands (and/or contracts) upon exposure to thermal energy (heat).

According to one advantageous aspect, the cushioning article of the disclosure has a heat transfer time to 150° C. greater than 20 seconds, greater than 60 seconds, greater than 100 seconds, greater than 150 seconds, greater than 180 seconds, greater than 200 seconds, greater than 240 seconds, greater than 280 seconds, greater than 300 seconds, greater than 320 seconds, greater than 340 seconds, greater than 350 seconds, or even greater than 360 seconds, when measured at 0.1 MPa according to the thermal insulation test method 2 described in the experimental section.

According to another advantageous aspect of the disclosure, the cushioning article has a heat transfer time to 150° C. in a range from 20 to 380 seconds, from 40 to 380 seconds, from 60 to 380 seconds, from 100 to 380 seconds, from 150 to 380 seconds, from 180 to 380 seconds, from 200 to 380 seconds, from 250 to 380 seconds, or even from 300 to 380 seconds, when measured at 0.1 MPa according to the test method 2 described in the experimental section.

According to still another advantageous aspect of the disclosure, the cushioning article has a heat transfer time to 150° C. greater than 20 seconds, greater than 40 seconds, greater than 60 seconds, greater than 80 seconds, greater than 100 seconds, greater than 120 seconds, greater than 140 seconds, or even greater than 150 seconds, when measured at 1 MPa according to the thermal insulation test method 2 described in the experimental section.

According to yet another advantageous aspect, the cushioning article of the disclosure has a heat transfer time to 150° C. in a range from 20 to 180 seconds, from 40 to 180 seconds, from 60 to 180 seconds, from 100 to 180 seconds, from 120 to 180 seconds, from 140 to 180 seconds, or even from 140 to 160 seconds, when measured at 1 MPa according to the thermal insulation test method 2 described in the experimental section.

According to yet another advantageous aspect, the cushioning article of the disclosure has a thermal conductivity no greater than 1 W/m·K, no greater than 0.8 W/m·K, no greater than 0.6 W/m·K, no greater than 0.5 W/m·K, no greater than 0.4 W/m·K, no greater than 0.3 W/m·K, no greater than 0.2 W/m·K, no greater than 0.1 W/m·K, no greater than 0.05 W/m·K, or even no greater than 0.01 W/m·K, when measured according to the test method described in the experimental section.

In yet another aspect, the cushioning article of the disclosure has a thermal conductivity in a range from 0.01 to 1 W/m·K, from 0.05 to 1 W/m·K, from 0.1 to 1 W/m·K, from 0.2 to 1 W/m·K, or even from 0.2 to 0.8 W/m·K, when measured according to the test method described in the experimental section.

In yet another aspect, the cushioning article of the disclosure has a V-0 classification, when measured according to the UL-94 standard flammability test method.

According to an exemplary aspect of the disclosure, the cushioning article has a thickness in a range from 100 to 20000 micrometers, from 100 to 15000 micrometers, from 100 to 10000 micrometers, from 100 to 8000 micrometers, from 100 to 6000 micrometers, from 200 to 5000 micrometers, from 300 to 5000 micrometers, from 300 to 4500 micrometers, from 300 to 4000 micrometers, from 500 to 4000 micrometers, from 1000 to 3000 micrometers, from 1000 to 2500 micrometers, from 1500 to 2500 micrometers, or even from 2000 to 2500 micrometers.

According to another aspect, the present disclosure is directed to a process for manufacturing a cushioning article as described above, wherein the process comprises the steps of:
a) providing a polymeric foam layer as described above;
b) providing a plurality of spacer elements as described above; and
c) incorporating the plurality of spacer elements into the polymeric foam layer such that the plurality of spacer elements is arranged within the polymeric foam layer such that each spacer element is at least partly embedded into the polymeric foam layer.

In one advantageous aspect, this process comprises the steps of making perforations in the polymeric foam layer and incorporating the plurality of spacer elements into the perforations of the polymeric foam layer.

In another advantageous aspect, this process comprises the steps of incorporating a (curable) precursor of the spacer elements into the perforations of the polymeric foam layer.

According to still another aspect, the present disclosure is directed to a process for manufacturing a cushioning article as described above, wherein the process comprises the steps of:
a) providing a substrate;
b) providing a solid film and applying it onto the substrate;
c) providing a coating tool provided with an upstream side and a downstream side, wherein the coating tool is offset from the substrate to form a gap normal to the surface of the substrate;
d) moving the solid film relative to the coating tool in a downstream direction;
e) providing a curable (and foamable) precursor of the polymeric foam to the upstream side of the coating tool thereby coating the precursor of the polymeric foam through the gap as a layer onto the substrate provided with the solid film;
f) providing a plurality of spacer elements as described above;
g) incorporating the plurality of spacer elements into the precursor of the polymeric foam such that the plurality of spacer elements is arranged within the precursor of the polymeric foam such that each spacer element is at least partly embedded into the precursor of the polymeric foam;
h) foaming or allowing the precursor of the polymeric foam to foam;
i) curing or allowing the layer of the precursor of the polymeric foam to cure thereby forming the polymeric foam layer;
j) optionally, exposing the layer of the precursor of the polymeric foam to a thermal treatment; and
k) optionally, removing the solid film from the polymeric foam layer.

In one advantageous aspect of this process, the step of incorporating the plurality of spacer elements into the precursor of the polymeric foam is performed by pressing the plurality of spacer elements into the precursor of the polymeric foam, in particular using the coating tool.

In another advantageous aspect of this process, the plurality of spacer elements is provided to the upstream side of the coating tool, in particular onto the substrate provided with the solid film.

In still another advantageous aspect of this process, the plurality of spacer elements is provided along the upstream side of the coating tool, such that the solid film and the plurality of spacer elements are applied and incorporated simultaneously with the formation of the (adjacent) layer of the precursor of the polymeric foam.

In yet another advantageous aspect of this process, the step of providing a curable (and foamable) precursor of the polymeric foam to the upstream side of the coating tool is performed immediately prior to the step of providing a second solid film and applying it along the upstream side of the coating tool, such that the first solid film and the second solid film are applied simultaneously with the formation of the (adjacent) layer of the precursor of the polymeric foam.

Figure 2:
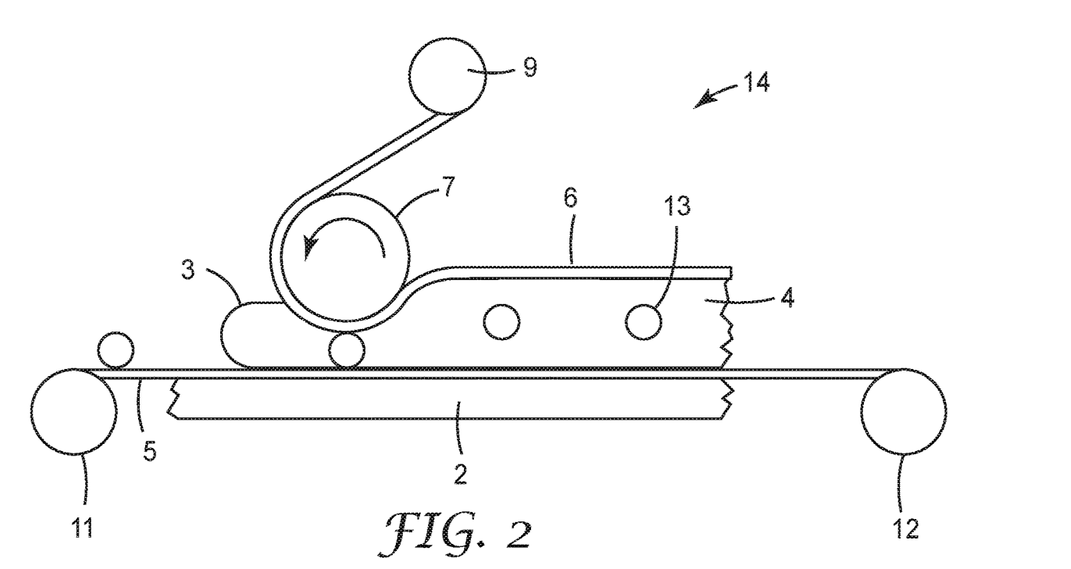
FIG. 2 is a schematic representation of one exemplary coating apparatus and a process of manufacturing a cushioning article according to one exemplary aspect of the present disclosure.

A schematic representation of this exemplary process of manufacturing a cushioning article and an exemplary coating apparatus are shown in FIG. 2. The exemplary coating apparatus for use in this process is very similar to the coating apparatus 1 described in FIG. 1, with the exception that it uses a rotating coating tool 7.

In a typical aspect of this exemplary process, the curable and foamable precursor of the polymeric foam 3 is provided to the upstream side of the coating tool 7 thereby coating the precursor of the polymeric foam 3 through the gap as a layer onto the substrate 2 provided with the first solid film 5. The second solid film 6 is applied (at least partly) along the upstream side of the coating tool 7, such that the first solid film 5 and the second solid film 6 are applied simultaneously with the formation of the layer of the precursor of the polymeric foam 3. A plurality of spacer elements 13 is provided onto the substrate 2 provided with the first solid film 5 to an upstream position relative to both the coating tool 7 and the precursor of the polymeric foam 3. The plurality of spacer elements 13 is provided along the upstream side of the coating tool 7, such that the solid film 5 and the plurality of spacer elements 13 are applied and incorporated simultaneously with the formation of the (adjacent) layer of the precursor of the polymeric foam 3.

The layer of the precursor of the polymeric foam 3 is thereafter allowed to foam and cure resulting into the polymeric foam layer 4, which is typically provided with the first solid film 5 on its bottom surface and with the second solid film 6 on its top surface, and with the plurality of spacer elements 13 incorporated within the polymeric foam layer 4. Optionally, the layer of the precursor of the polymeric foam 3 may be exposed to a thermal treatment, typically in an oven (not shown). After processing, the first solid film 5 and/or the second solid film 6 may be removed from the polymeric foam layer 4, thereby providing the cushioning article 14.

In another advantageous aspect of this process, the (external surface of the) coating tool is provided with a material which is at least partly (elastically) deformable (or compressible) upon exposure to physical force (pressure).

In another advantageous aspect of this process, the (external surface of the) substrate or the solid film(s) is provided with a material which is at least partly (elastically) deformable (or compressible) upon exposure to physical force (pressure).

In still another advantageous aspect of this process, the plurality of spacer elements is incorporated into the precursor of the polymeric foam (during or) after the formation of the layer of the precursor of the polymeric foam, and in particular before the step of curing or allowing the layer of the precursor of the polymeric foam to cure.

In yet another advantageous aspect of this process, the plurality of spacer elements is incorporated into the precursor of the polymeric foam (during or) after the formation of the layer of the precursor of the polymeric foam, and in particular after the step of curing or allowing the layer of the precursor of the polymeric foam to cure.

In one advantageous aspect of this process, the step of providing a curable (and foamable) precursor of the polymeric foam to the upstream side of the coating tool is performed immediately prior to the step of providing the spacer layer or the solid film and applying it along the upstream side of the coating tool.

In another advantageous aspect of this process, the step of foaming or allowing the precursor of the polymeric foam to foam and the step of curing or allowing the layer of the precursor of the polymeric foam to cure thereby forming the polymeric foam layer are performed simultaneously.

According to another aspect, the present disclosure is directed to a thermal barrier article comprising a cushioning article as described above.

According to still another aspect, the present disclosure relates to a rechargeable electrical energy storage system, in particular a battery module, comprising a thermal (runaway) barrier article as described above.

In yet another aspect, the present disclosure is directed to a battery module comprising a plurality of battery cells separated from each other by a gap, and a cushioning article as described above positioned in the gap between the battery cells.

Figure 8:
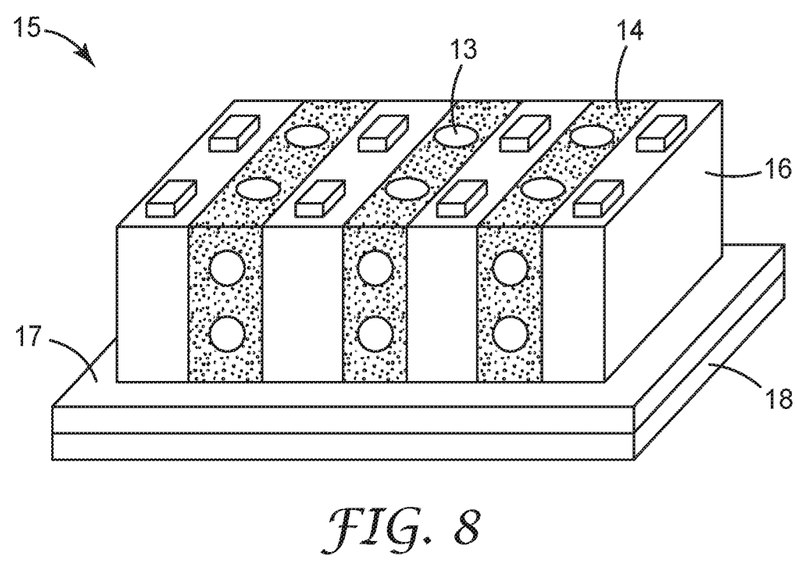
FIG. 8 illustrates an exemplary battery module assembly according to one aspect of the present disclosure.

FIG. 8 illustrates an exemplary assembled battery module 15 according to one aspect of the present disclosure, which comprises a plurality of battery cells 16 separated from each other by a gap, and a plurality of cushioning articles 14 positioned in the gap between the battery cells 16. The battery module is further provided with a base plate 18 upon which is positioned a thermally conductive gap filler 17.

Suitable battery modules, battery subunits and methods of manufacturing thereof for use herein are described e.g. in EP-A1-3352290 (Goeb et al.), in particular in FIG. 1 to FIG. 3 and in paragraphs [0016] to [0035], the content of which is herewith fully incorporated by reference.

According to an advantageous aspect of the battery module according to the disclosure, the battery cells for use herein are selected from the group consisting of pouch energy storage cells and prismatic energy storage cells, in particular from the group of pouch energy storage cells.

According to another aspect, the present disclosure is directed to a method of manufacturing a battery module, which comprises the steps of:
 a) providing a plurality of battery cells separated from each other by a gap; and
 b) positioning a cushioning article as described above in the gap between the battery cells.

According to still another aspect, the present disclosure is directed to a method of cushioning at least one expanding (and/or contracting) surface, which comprises the step of applying a cushioning article as described above onto at least part of the least one expanding (and/or contracting) surface. In one particular aspect, the at least one expanding (and/or contracting) surface expands (and/or contracts) upon exposure to thermal energy (heat).

According to still another aspect, the present disclosure relates to the use of a cushioning article as described above for industrial applications, in particular for thermal management applications, more in particular in the transportation industry, even more in particular in the automotive, aeronautic and aerospace industries.

According to yet another aspect, the present disclosure relates to the use of a cushioning article as described above as a thermal barrier, in particular a thermal runaway barrier.

In yet another aspect, the present disclosure relates to the use of a cushioning article as described above as a thermal barrier spacer, in particular a thermal runaway barrier spacer, in a rechargeable electrical energy storage system, in particular a battery module.

In yet another aspect, the present disclosure relates to the use of a cushioning article as described above as a thermal barrier spacer, in particular a thermal runaway barrier spacer, between the plurality of battery cells present in a rechargeable electrical energy storage system, in particular a battery module.

In yet another aspect, the present disclosure relates to the use of a cushioning article as described above as a cushioning spacer, in particular between the plurality of battery cells present in a rechargeable electrical energy storage system, in particular a battery module.

In yet another aspect, the present disclosure relates to the use of a cushioning article as described above as a cushioning spacer for cushioning at least one expanding (and/or contracting) surface, wherein the at least one expanding surface expands (and/or contracts) in particular upon exposure to thermal energy (heat).

EXAMPLES

The present disclosure is further illustrated by the following examples. These examples are merely for illustrative purposes only and are not meant to be limiting on the scope of the appended claims.

Test Methods:

1) Thermal Stability Test

This test was performed in a muffle furnace at 600° C. Test specimens were cut out of sample sheets and placed in a porcelain crucible. The porcelain crucible was then placed in the furnace at 600° C. for three minutes, then taken out and allowed to cool down before being analyzed via microscopy. The weight loss of the sample after three minutes at 600° C. (in %) was calculated.

2) Thermal Insulation Test 1

This test was performed using a tensile/compression tester from Zwick in compression mode. The compression tester was equipped with two plates (dimensions: 65×80×20 mm W×L×H, made of Inconel® steel, the outer faces being thermally insulated): a cold (23° C.) bottom plate equipped with a thermocouple to record temperature and a heated upper plate with a constant temperature of 600° C. At the beginning of the test, a heat shield was placed between the two plates. A sample was placed on the bottom cold plate, then the heat shield was removed. The upper plate was moved to a gap of 1000 micrometers between the two plates and the temperature increase of the cold plate was recorded over time. Specifically, the time when the cold plate reached 150° C. was recorded in seconds.

3) Thermal Insulation Test 2

This test was performed using a tensile/compression tester from Zwick in compression mode. The compression tester was equipped with two plates (dimensions: 65×80×20 mm W×L×H, made of Inconel® steel, the outer faces being thermally insulated): a cold (23° C.) bottom plate equipped with a thermocouple to record temperature and a heated upper plate with a constant temperature of 600° C. At the beginning of the test, a heat shield was placed between the two plates. A sample was placed on the bottom cold plate, then the heat shield was removed. The upper plate was moved towards the bottom plate until a certain counter pressure or compression force was reached (0.1 MPa or 1 MPa). The pressure was maintained over the measurement time. The temperature increase of the cold plate was then recorded over time. Specifically, the time when the cold plate reached 150° C. was recorded in seconds.

4) Thermal Conductivity Measurement

The thermal conductivity of the cured compositions was measured using the flash analysis method in a Netzsch Hyperflash LFA 467 (Netzsch, Selb, Germany) according to ASTM E1461/DIN EN821(2013). Samples of 1 mm thickness were prepared by coating of the curable composition between two PET release liners with a knife coater and curing at room temperature. The samples were then carefully cut to 10 mm×10 mm squares with a knife cutter to fit in the sample holder. Before measurement, samples were coated with a thin layer of graphite (GRAPHIT 33, Kontakt Chemie) on both sides. In a measurement, the temperature of the top side of the sample was measured by an InSb IR detector after irradiation of a pulse of light (Xenon flash lamp, 230 V, 20-microsecond duration) to the bottom side. Diffusivity was then calculated from a fit of the thermogram by using the Cowan method. Three measurements were done for each sample at 23° C. For each formulation, three samples were prepared and measured. The thermal conductivity was calculated from the thermal diffusivity, density and specific heat capacity of each sample. The thermal capacity (Cp) was calculated in Joules per gram per Kelvin using the Netzsch-LFA Hyper Flash in combination with a standard sample (Polyceram). The density (d) was determined in grams per cubic centimeter based on the weight and geometric dimensions of the sample. Using these parameters, the thermal conductivity (L) was calculated in Watts per meter Kelvin according to L=a·d·Cp.

5) Flammability Test

The test was performed using the UL-94 standard, the Standard for safety of Flammability of Plastic Materials for Parts in Devices and Appliances testing. The UL-94 standard is a plastics flammability standard released by Underwriters Laboratories of the United States. The standard determines the material's tendency to either extinguish or spread the flame once the specimen has been ignited. The UL-94 standard is harmonized with IEC 60707, 60695-11-10 and 60695-11-20 and ISO 9772 and 9773. A 75 mm×150 mm sample was exposed to a 2 cm, 50 W tirrel burner flame ignition source. The test samples were placed vertically above the flame with the test flame impinging on the bottom of the sample. For each sample, the time to extinguish was measured and V ratings are assigned. V ratings are a measure to extinguish along with the sample not burning to the top clamp or dripping molten material which would ignite a cotton indicator, as shown in Table 1 below.

TABLE 1

UL94 classification (V rating).

| | UL 94 classification | | |
|---|---|---|---|
| | V-0 | V-1 | V-2 |
| Burning stops within | 10 s | 30 s | 30 s |
| Drips of burning material allowed (ignites cotton ball) | No | No | Yes |
| Total burn of sample | No | No | No |

6) Compression Test

Compression testing was performed using a tensile tester from Zwick in compression mode. The sample had a diameter of 50.8 mm and a thickness >1000 micrometers. The test was performed at 23° C. The upper plate of the compression tester was moved with a speed of 1 mm/min until a maximum force of 2 MPa was reached. The compression force (in kPa) required to reach a compression value of at least 60% was recorded.

7) Coating Weight

The coating weight of the polymeric foam layers was measured by weighing a sample of 100 cm$^2$ cut out of the sample layer using a circle cutter. The coating weight was then converted in g/m$^2$.

8) Thickness

The thickness of the polymeric foam layers was measured using a thickness gauge.

9) Density

The density (in g/m$^3$) of the polymeric layers was calculated by dividing the coating weight of the foam layers (in g/m$^2$) by their thickness (in m).

10) SEM Micrographs

The polymeric foam images were obtained from SEM micrographs recorded on a Tabletop Microscope TM3030, available from Hitachi High-Tech Corporation.

Raw Materials:

In the examples, the following raw materials were used:

DOWSIL 3-8235 is a 2-part room temperature curable silicone rubber foam formulation commercially available under the trade designation DOWSIL obtained from the Dow Chemical Company of Midland, MI. United States.

VTV750 is a 2-part room temperature curable liquid silicone rubber with a shore hardness of A40, commercially obtained from Renishaw PLC, United Kingdom.

Ultralux glass beads (600-1300 micrometers granulometry), obtained from Weissker GmbH, Germany.

OL104LEO is an Aluminum Hydroxide with a d$_{50}$ in a range from 1.7 to 2.1 micrometers, commercially available under the trade designation MARTINAL from Martinswerk GmbH, Germany.

CF30 are mineral fibers with a length of 300 micrometers, commercially available under the designation COATFORCE CF30 from Lapinus Fibers B.V., The Netherlands.

RN 50/50 is a PET solid film commercially available under the designation HOSTAPHAN RN 50/50 obtained from Mitsubishi Polyester Film of Greer, SC. United States.

EXAMPLES

General Hand-Made Preparation Method for an Exemplary Cushioning Article (Example 1)

The exemplary hand-made cushioning article of Example 1 was prepared according to the following procedure:

DOWSIL 3-8235 parts A and B were filled in a special cartridge system equipped with a dynamic mixing head (3M 05846 Pneumatic Dynamic Mixing System obtainable from 3M Company of St. Paul, MN. United States). The cartridge had a 1:1 volumetric mixing ratio and an adapted dynamic mixing nozzle for 1:1 system (3M 05847 Dynamic Mixing Nozzles also obtained from 3M). By applying a pressure of 4 bars, the piston of the dispensing equipment pushed the material through the nozzle rotating at 2000-3000 revolutions per minute (RPM). This mixture was then coated with a knife coater onto a PET liner. 10 grams (g) of the Ultralux glass beads were homogeneously spread over an area of 20×50 cm (0.1 m$^2$) using a bead spreader apparatus and corresponding to an amount of 100 g/m$^2$. Immediately after spreading the glass beads, the sample was covered by a second liner and pressed onto the silicone layer. The obtained sheets expanded, and the reaction was completed by putting the sheets in a forced air oven at 80° C. for 10 minutes.

General Hand-Made Preparation Method for the Comparative Cushioning Article (Example CE-1)

The exemplary hand-made comparative cushioning article CE-1 was prepared as described in Example 1 above, with the exceptions that the polymeric foam layer did not incorporate any glass beads, and the mixture was coated between two PET liners. The curing reaction was completed by putting the sheet in a forced air oven at 80° C. for 10 minutes.

General Hand-Made Preparation Method for an Exemplary Cushioning Article (Example 2)

The exemplary hand-made cushioning article of Example 2 was prepared according to the following procedure:

DOWSIL 3-8235 parts A and B were filled in a 200 mL two-part cartridge system from Adchem GmbH (of Wendelstein, Bayern, Germany) with a volumetric mixing ratio of 1:1 (200 ml F System cartridge). The two-part silicone system was mixed with a static mixer (MFH 10-18T) using a dispensing gun at 4 bar air pressure. After releasing 50 g of the mixed silicone in a jar, the mixture was additionally homogenized by hand using a wooden spatula for 10 seconds. This mixture was then coated with a knife coater between 2 layers of solid RN 50/50 film. The obtained sheet expanded, and the reaction was completed by putting the sheet in a forced air oven at 80° C. for 10 minutes.

The obtained polymeric foam layers were perforated with holes having a diameter of 3 mm using a 3 mm punch and a hammer. The perforated holes had a quadratic pattern with a distance of 15×15 mm.

A liquid silicone rubber filler formulation (precursor of the spacer elements) was prepared by mixing the parts identified in Table 2 of VTV750, OL104LEO, and CF30 in a speedmixer for two minutes at 2000 RPM.

TABLE 2

| Liquid silicone rubber filler formulation | |
|---|---|
| | Ingredients (parts) |
| VTV750 | 100 |
| CAT750 | 10 |
| OL104LEO | 80 |
| CF30 | 10 |

Prior to the casting of the liquid silicone rubber, a quantity (identified in Table 2) of CAT750 catalyst was added and mixed with a speedmixer for 40 seconds at 2000 RPM. The liquid silicone rubber was then filled into the perforated holes of the polymeric foam layer using a knife coating process. The gap of the knife coater corresponds to the thickness of the foam, i.e. the silicone rubber spacer elements have the same thickness than the uncompressed polymeric foam layer. The resulting construction was allowed to cure for two hours at 80° C. resulting in the cushioning article of Example 2.

General Hand-Made Preparation Method for the Comparative Cushioning Article (Example CE-2)

The exemplary hand-made comparative cushioning article CE-2 was prepared as described above, with the exceptions that the polymeric foam layer did not incorporate any perforated holes and no spacer elements.

Exemplary Cushioning Articles (Examples 1 and 2) and Comparative Examples CE-1 and CE-2

The exemplary cushioning articles and the comparative examples are shown in Table 3, where the complementary processing parameters are specified. Comparative examples CE-1 and CE-2 feature neat polymeric foam layers without any spacer elements. Thermal insulation performance testing (Test 2) was conducted, and the results are represented in Tables 4 and 5.

TABLE 3

|  | Examples | | | |
| --- | --- | --- | --- | --- |
|  | Ex. 1 | Ex. 2 | CE-1 | CE-2 |
| Coating knife gap (micrometers) | 350 | 350 | 350 | 350 |
| Coating weight (g/m²) | 641 | 537 | 481 | 537 |
| Final foam thickness (micrometers) | 2150 | 2450 | 2150 | 2450 |

Thermal Insulation Performance (Test 2)

TABLE 4

Results of the thermal insulation performance test (with a constant compression force of 0.1 MPa)

|  | Examples | |
| --- | --- | --- |
|  | Ex. 2 | CE-2 |
| Compressed construction thickness (micrometers) | 1800 | 680 |
| Time to reach 150° C. (seconds) | 343 | 128 |

TABLE 5

Results of the thermal insulation performance test (with a constant compression force of 1 MPa)

|  | Examples | | | |
| --- | --- | --- | --- | --- |
|  | Ex. 1 | CE-1 | Ex. 2 | CE-2 |
| Compressed construction thickness (micrometers) | 1000 | 460 | 840 | 450 |
| Time to reach 150° C. (seconds) | 153 | 60 | 118 | 60 |

The invention claimed is:

1. A cushioning article comprising:
   a non-syntactic polymeric foam layer; and
   a plurality of spacer elements arranged within the polymeric foam layer, wherein each spacer element is at least partly embedded into the polymeric foam layer, and wherein each spacer element has a size greater than 200 micrometers,
   wherein the spacer elements are made out of an elastomeric material.

2. An article according to claim 1, wherein the polymeric foam layer comprises a material having a weight loss after 3 min at 600° C. of no greater than 70%.

3. An article according to claim 1, wherein the polymeric foam layer comprises a material selected from the group consisting of elastomeric materials, thermoplastic materials, thermoplastic elastomer materials, thermoplastic non-elastomeric materials, thermoset materials, and any combinations or mixtures thereof.

4. An article according to claim 1, wherein the polymeric foam layer comprises a material selected from the group consisting of silicone elastomers.

5. An article according to claim 1, wherein the polymeric foam layer reaches a compression value of at least 60% when using a compression force of no greater than 700 kPa.

6. An article according to claim 1, wherein the spacer elements are dense elements.

7. An article according to claim 1, wherein the plurality of spacer elements is arranged within the polymeric foam layer in a uniform manner along the plane formed by the polymeric foam layer.

8. An article according to claim 1, wherein the plurality of the spacer elements is fully embedded into the polymeric foam layer.

9. An article according to claim 1, wherein each spacer element has a size greater than 250 micrometers.

10. An article according to claim 1, wherein each spacer element has an aspect ratio AR (ratio x/y), where x is the length of the greatest dimension of the spacer element and y is the length of the smallest dimension of the spacer element, and wherein the aspect ratio of each spacer element is no greater than 5.

11. An article according to claim 1, wherein each spacer element has an overall shape when seen from a top view selected from the group consisting of semi-circular, square, triangular, rectangular, diamond, polygonal, linear stripes, non-linear stripes, curved stripes, and any combinations thereof.

12. An article according to claim 1, wherein the spacer elements are made out of silicone elastomers.

13. An article according to claim 1, wherein the plurality of spacer elements is arranged in a pattern structure.

14. An article according to claim 1, wherein the plurality of spacer elements is arranged in a pattern structure chosen from of lattice patterns, quadratic patterns, diamond patterns, honeycomb patterns, patterns comprising straight or wavy lines running in parallel, checkerboard patterns, brick patterns, and any combinations thereof.

15. An article according to claim 1, wherein the spacer elements are compressible.

16. An article according to claim 1, wherein the spacer elements have a non-spherical shape.

17. An article according to claim 1, wherein the spacer elements do not comprise electrically conductive particles.

18. A process for manufacturing an article, wherein the process comprises the steps of:
   providing a polymeric foam layer as described in claim 1;
   providing a plurality of spacer elements as described in claim 1; and
   incorporating the plurality of spacer elements into the polymeric foam layer such that the plurality of spacer elements is arranged within the polymeric foam layer such that each spacer element is at least partly embedded into the polymeric foam layer.

* * * * *